Jan. 5, 1971 C. A. PESCE ET AL 3,553,567
HIGH CURRENT SQUARE WAVE POWER SOURCE
Original Filed July 26, 1966

INVENTORS
CARL A. PESCE,
ERNEST M. GORE &
JAMES P. TATHAM

ATTORNEYS

INVENTORS
CARL A. PESCE,
ERNEST M. GORE &
JAMES P. TATHAM

ATTORNEYS

Fig. 5

United States Patent Office 3,553,567
Patented Jan. 5, 1971

3,553,567
HIGH CURRENT SQUARE WAVE POWER SOURCE
Carl A. Pesce and Ernest M. Gore, Chicago, and James P. Tatham, Wheaton, Ill., assignors to Continental Can Company, Inc., New York, N.Y., a corporation of New York
Continuation of application Ser. No. 568,042, July 26, 1966. This application Dec. 20, 1968, Ser. No. 785,726
Int. Cl. H02h 7/14; B02k 11/26; H02i
U.S. Cl. 321—14
24 Claims

ABSTRACT OF THE DISCLOSURE

A square wave power supply used in pressure seam welding of can bodies. Photoelectric cells detect the presence and location of can bodies passing between pressure roller electrodes to actuate solid state switches. A three phase A.C. source is rectified and filtered to produce a source of direct current. An output transformer and a first SCR are connected in series across the direct current source. Connection of the output transformer with the direct current source is controlled by two timing circuits, one of which controls the conduction duration of the first SCR and the second of which controls the blocking duration of the SCR. Conduction of the SCR is terminated by a positive quenching thereof through the application of a voltage across the SCR greater than and in opposition to the voltage output from the direct current source. A substantially well defined and consistent square wave output is provided by pulse-shaping circuit elements in cooperation with the output transformer and SCR and by establishment of a preliminary flux level in the output transformer prior to the initiation of and upon termination of a train of square wave output current signals. An overload timing circuit protects the supply by terminating the input thereto.

---

This is a continuation application of Ser. No. 568,042, filed July 26, 1966, for High Current Square Wave Power Source.

This invention relates to square wave power sources and has for its object to provide a power source capable of producing substantially flat-topped pulses of output current in the neighborhood of 10,000 amperes at pulse repetition rates in the order of 500 cycles per second. Although the invention has application in many fields, it is particularly useful in pressure seam welding and will be described in connection therewith.

In pressure seam welding, two pieces of metal which are to be seam welded together are passed through pressure-roller electrodes which heat the pieces of metal by passing an electrical current through them and simultaneously press the two pieces of metal together to form a pressure weld. In this type of welding, it is necessary to use alternating current for heating the metal to avoid damage due to arcing. As the metal passes through the pressure-roller electrodes, arcing occurs due to the normal irregularities of the metal, and a direct current arc cannot be extinguished except by disengaging the electodes or turning the power off. Accordingly, it is necessary to heat the metal with pulses of alternating current, so that any arcs which occur will be quenched by a reversal of current before they can damage the pressure welded seam.

Moreover, in pressure seam welding it is necessary to apply substantially square pulses of current to the metal to be welded in order to hold the temperature thereof in a relatively narrow zone between the melting point of the metal and the temperature below which it will not weld under pressure. If the metal melts, the seam will be spoiled due to expulsion of metal, and if the metal is not hot enough, the seam will be spoiled by unwelded gaps that leak under pressure. Since the difference between these two limiting temperatures is only about 10% for most alloys of steel, this means that in practice the temperature of the metal must be maintained within a ±5% tolerance range as it passes through the pressure seam welding rollers. Needless to say, this requires a substantially flat topped current pulse with a rise time which is fast enough to preclude cooling of the metal below the welding temperature between pulses.

In many applications of pressure seam welding, the required current pulses can be provided by existing power supply circuits, but in pressure seam welding of can bodies, several complicating factors arise which make it impossible to provide the required current pulses with known power supply circuits. For proper pressure seam welding of can bodies, it is necessary to heat the seam with substantially flat topped current pulses in the neighborhood of 10,000 amperes at pulse repetition rates in the order of 500 cycles per second. Moreover, since can bodies are welded at linear speeds of 100 feet per minute, it is necessary for the pulses to have a relatively fast rise time to prevent cooling of the metal between pulses. It will be apparent to those skilled in the art that current pulses of this character are beyond the capability of presently known power supply circuits.

The major impediment in producing square wave current pulses of 10,000 amperes is that inductive reactance, which opposes any change of current flow, is directly proportional to the rate of change of current, which in turn is directly proportional to the magnitude of current change. For example, suppose that a given prior art power supply circuit is capable of producing square wave current pulses of 10 amperes at 500 cycles per second with a rise time of N microseconds. In this circuit, the average rate of change of current would be 10/N amperes per microsecond at the leading edge of each square wave pulse. To produce a square wave pulse of 10,000 amperes with the same rise time would, however, involve an average rate of change of current of 10,000/N amperes per microsecond at the leading edge of each square wave pulse. This would multiply the inductive reactance of the prior art circuit by 1,000, which would tend to multiply the rise time by the same amount. Accordingly, it will be apparent that the problem of inductive reactance alone precludes the generation of square wave current pulses in the neighborhood of 10,000 amperes with circuits that are adapted to produce square wave current pulses of 10 amperes, 100 amperes, or even 1,000 amperes.

Moreover, in welding applications, an equally serious impediment arises due to the fact that the current pulses have to be coupled to the welding electrode through an iron core welding transformer, which substantially increases the inductance of the circuit and adds a further source of pulse distortion. Iron core transformers distort square wave pulses at any current level, and their distortion increases in direct proportion with the rate of current change. Furthermore, in seam welding of can bodies, additional inductance is encountered in the welder itself, which necessarily contains large bodies of ferromagnetic material in close proximity to the welding electrodes and current conductors. These added inductances seriously aggravate the problems of producing a flat topped current pulse with a fast rise time at such high current levels.

In accordance with this invention, however, these impediments have been overcome and a high current power source has been devised which is capable of providing substantially flat-topped pulses of output current in the neighborhood of 10,000 amperes at pulse repetition rates in the order of 500 cycles per second. In general terms, the power supply circuit of this invention utilizes a switched silicon controlled rectifier to apply a square wave voltage of predetermined pulse width and frequency to the primary winding of a welding transformer. Distortion of the pulse in the transformer is minimized by a novel transformer core biasing circiut and by a novel combination of wave shaping circuit elements in the secondary circuit of the welding transformer and the voltage source which drives the primary of the welding transformer. Distortion is further reduced by a novel SCR quenching circuit which shortens the turn-off time for the silicon controlled rectifier. The invention also includes a novel overload timing circuit for protecting the circuit from excessive current, and more specific novel features which will be discussed in detail later.

Accordingly, one object of this invention is to provide a power source capable of producing substantially flat-topped pulses of output current in the neighborhood of 10,000 amperes at pulse repetition rates in the order of 500 cycles per second.

Another object of this invention is to provide a novel transformer core biasing circuit for reducing the distortion of square wave current pulses in iron core transformers.

A further object of this invention is to provide a novel combination of wave shaping circuit elements for reducing the distortion of square wave current pulses in pulse circuits which include iron core transformers.

An additional object of this invention is to provide a novel SCR quenching circuit which shortens the turn-off time for silicon controlled rectifiers.

Another object of this invention is to provide a novel overload timing circuit for protecting pulse circuits from excessive current.

Other objects and advantages of the invention will be apparent to those skilled in the art from the following description of one specific embodiment thereof, as illustrated in the attached drawings, in which:

Figure 1:
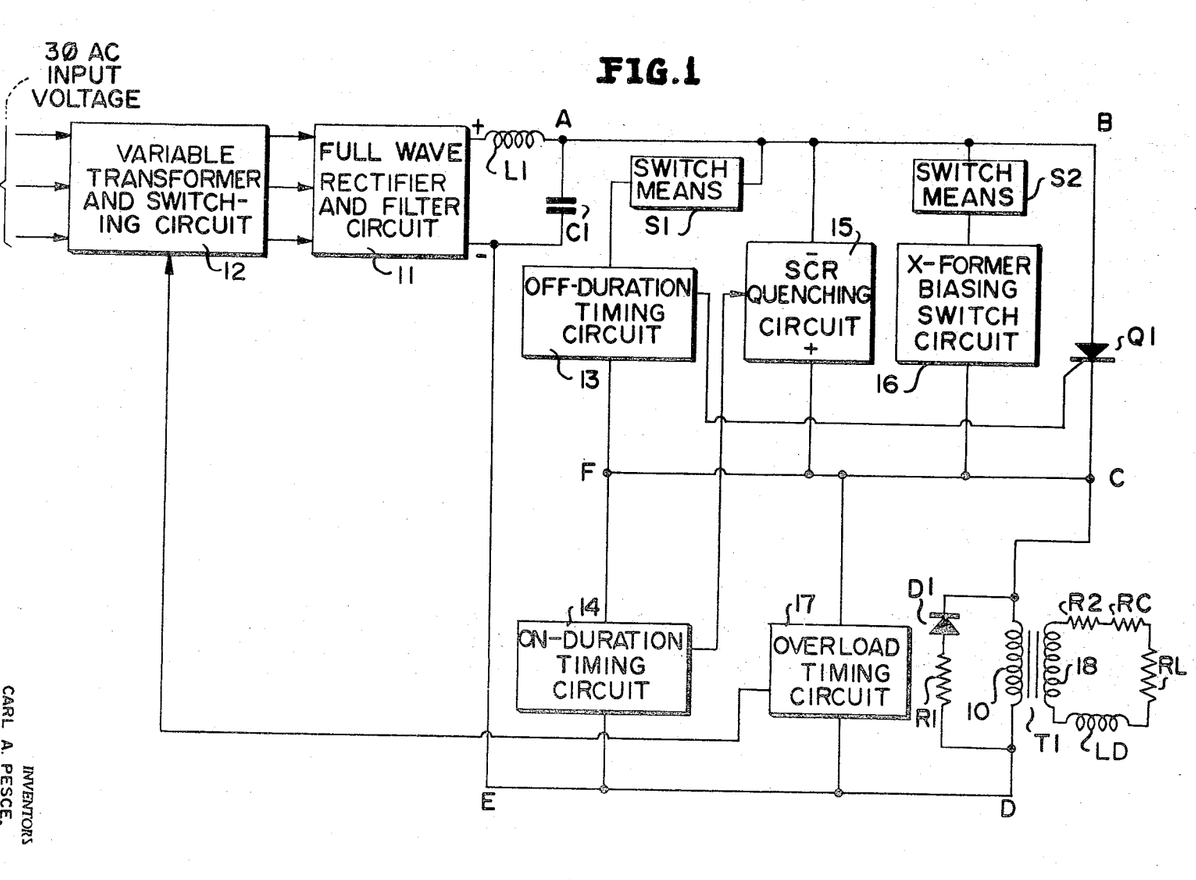
FIG. 1 is a block diagram and schematic circuit diagram of one illustrative embodiment of the invention.

FIG. 1 shows an embodiment of the invention which is particularly adapted for use in pressure seam welding of can bodies. In this embodiment, voltage pulses of predetermined width and frequency are applied to the primary winding 10 of a welding transformer T1 through a silicon controlled rectifier Q1 which is connected in series with the primary winding 10. Power is applied to this circuit by a DC power supply comprising a full wave rectifier and filter circuit 11 which is driven by a three phase AC input voltage applied thereto through a variable transformer and switching circuit 12. Circuits 11 and 12 can comprise any suitable prior art circuits for providing direct current power. A wave shaping inductance L1 and wave shaping capacitor C1 are connected across the output of rectifier and filter circuit 11, and these circuit elements, in combination with other circuit elements, serve to produce a substantially flat-topped output wave form with a fast rise time as will be discussed in detail in later paragraphs.

Silicon controlled rectifier Q1 is switched off and on to apply substantially square wave voltage pulses to the primary winding 10 by means of an off-duration timing circuit 13, which fires silicon controlled rectifier Q1 after it has been off for a predetermined length of time, and by an on-duration timing circuit 14, which turns silicon controlled rectifier Q1 off through SCR quenching circuit 15 after it has been on for a predetermined length of time. This applies a time sequence of substantially square DC voltage pulses of predetermined width to the primary winding 10 with a predetermined space between the voltage pulses. A transformer biasing switch circuit 16 serves to establish the initial magnetic bias for the core of transformer T1 and to prevent the large transient pulse that would otherwise be generated by decay of the magnetic fields in the transformer when the circuit is turned off.

An overload timing circuit 17 automatically disconnects the power to the rectifier and filter circuit 11 whenever the voltage pulse applied to primary winding 10 exceeds a predetermined pulse width. This prevents damage to the circuit which would arise if on-duration timing circuit 14 failed to function, thus allowing silicon controlled rectifier Q1 to conduct continuously.

In this particular embodiment of the invention, the off-duration timing circuit 13, on-duration timing circuit 14, and overload timing circuit 17 are operable in response to the voltage drops normally appearing across silicon controlled rectifier Q1 and primary winding 10 as Q1 is switched on and off. This can be better understood by considering the voltage drops around the circuit loop A, B, C, D, E as silicon controlled rectifier Q1 is switched off and on. In the initial state Q1 is switched off and all of the output voltage from rectifier 11 appears across Q1 and there is no voltage drop across the primary winding 10. This means that the power supply voltage is applied between points B and C on the circuit and that there is no voltage drop between the points C and D. Accordingly, voltage will be applied across off-duration timing circuit 13 but not across on-duration timing circuit 14 or overload timing circuit 17. Off-duration timing circuit 13 is operable to produce an output pulse a predetermined time after it is energized by the voltage drop appearing across Q1. In the initial state, off-duration timing circuit 13 is disconnected by switch S1. When switch S1 is closed, the voltage appearing between points B and C will be applied to off-duration timing circuit 13, and it will produce an output pulse a predetermined time later. This output pulse is applied to the trigger terminal of silicon controlled rectifier Q1 to fire the rectifier. When Q1 fires, substantially all of the power supply voltage appears across the primary winding 10 and the voltage drop across Q1 drops substantially to zero. This means that the full power supply voltage will now appear between points C and D on the circuit and that there will be substantially no drop between points B and C. The voltage drop between points C and D energize on-duration timing circuit 14 and overload timing circuit 17. On-duration timing circuit 14 is adapted to produce an output pulse a predetermined time after it has been energized, and this output pulse is applied to SCR quenching circuit 15, which applies a reverse voltage across SCR Q1 in accordance with the polarities indicated within the box 15 to quench SCR Q1. If on-duration timing circuit 14 fails to produce an output pulse before a predetermined overload limit time, overload timing circuit 17 will automatically produce an output signal which is applied to variable transformer and switching circuit 12 to disconnect the power from rectifier 11. This prevents the transformer and other circuit elements from being damaged by continuous conduction of SCR Q1. If on-duration timing circuit 14 operates properly, however, SCR Q1 will be extinguished by the reverse voltage applied by quenching circuit 15, and the circuit will revert to its initial condition in which the power supply voltage is applied between points B and C, thereby reenergizing off-duration timing circuit 13 and initiating another cycle of operation. This process is repeated continuously as long as switch 31 is closed and power is applied to the circuit.

When the circuit of FIG. 1 is initially actuated, the core of transformer T1 will be unmagnetized, and the first several pulses applied to primary winding 10 would therefore develop an output which would be several times greater than what would be obtained after the average steady state DC current level in the primary had been established. This problem is avoided by means of transformer biasing switch circuit 16. This circuit is energized by switch means S2 as soon as power is applied to the circuit and before switch S1 has been closed to initiate the first timing cycle of off-duration timing circuit 13. Transformer biasing switch circuit 16 shunts a predetermined level of current around SCR Q1 to establish the average steady state DC current level in primary winding 10 before the first cycle of operation is initiated. Switch S2 is turned off when switch S1 is turned on.

The output pulses from transformer T1 are coupled through secondary winding 18 to a load resistance RL, which in this particular embodiment of the invention comprises the pressure roller electrodes of a can body seam welder. The current pulses developed in secondary winding 18 are coupled to the load resistance RL through conductors which contain an inherent resistance which is symbolized by the resistance element RC and which also contain inherent inductance which, along with the inductance of the welding electrodes, is symbolized by the inductive element LD. Since the distributed inductance in can seam welding equipment is large with respect to the conductor and load resistance, the secondary circuit of transformer T1 is predominantly inductive. This inductance, along with the inductance of the transformer, tends to distort the current pulses coupled to load resistance RL, and to achieve the required flatness on the top of the waveform, a resistor R2 is coupled in series with the load resistance RL to dampen the distorting effects of inductance LD. Resistor R2, however, is only one of the wave shaping elements used in this invention. The others will be described in later paragraphs.

When SCR Q1 is turned off by on-duration timing circuit 14, the magnetic field around primary winding 10 collapses and drives current through resistor R1 and diode D1, which are connected in parallel with primary winding 10. The decay of current in primary winding 10 induces a voltage of opposite polarity in secondary winding 18, and the value of resistor R1 is selected to limit this flyback voltage pulse to approximately the same level as the pulse which caused it and to flatten the flyback pulse by damping primary winding 10. This produces an alternating series of output pulses in the secondary winding 18, the positive pulse corresponding to the on-time of SCR Q1, and the negative pulse corresponding to the flyback time.

In addition to resistors R1 and R2, the wave shaping circuit elements of this invention include an inductance L1 connected in series will the output of full wave rectifier and filter circuit 11, and a capacitor C1 connected in parallel with the output of full wave rectifier and filter circuit 11. Inductance L1 is an isolating choke which isolates capacitor C1 from the other filter capacitors in full wave rectifier and filter circuit 11. This permits capacitor C1 to be fully discharged when SCR Q1 is switched on, and to be fully charged during the flyback voltage developed across the primary winding 10 when SCR Q1 is turned off. This speeds the rise and fall time for the current pulse generated through transformer T1.

It will be understood by those skilled in the art that any suitable prior art circuits can be used to embody the above described circuit units 11, 12, 13, 14, 15, 16 and 17. It is preferable, however, to employ the specific circuits illustrated in FIGS. 2 through 5 for reasons which will be discussed below.

Figure 2:
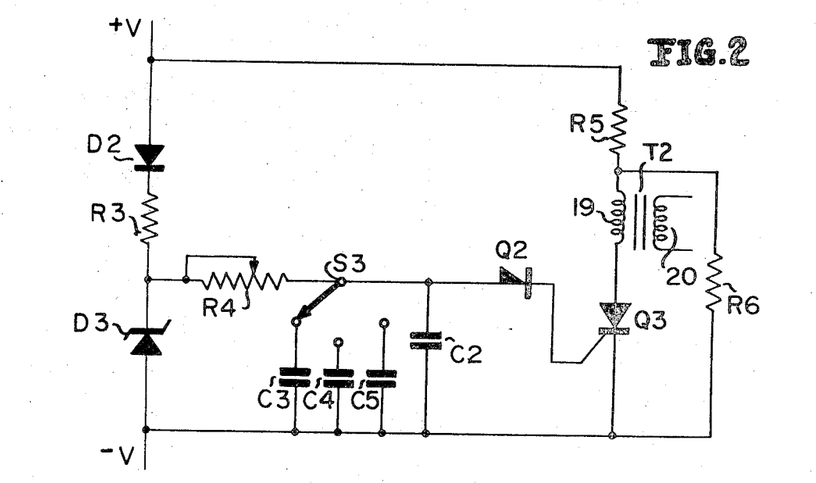
FIG. 2 is a schematic circuit diagram of one illustrative timing circuit which can be used for the off duration and on duration timing circuit shown in FIG. 1.

FIG. 2 shows the preferred timing circuit which can be used both for off-duration timing circuit 13 and on-duration timing circuit 14. When the circuit is used as off-duration timing circuit 13, the power input terminal marked +V is coupled to switch S1 of FIG. 1, and the power input terminal marked −V is coupled to the conductor FC of FIG. 1. The circuit operation, however, is identical in either case, since the function of both circuits 13 and 14 is to produce an output pulse a predetermined time after they have been energized by a voltage drop applied thereacross. Referring to FIG. 2, when a voltage is applied between the terminals +V and −V with the indicated polarity, diode D2 conducts in the forward direction through resistor R3 and in the reverse direction through Zener diode D3 to apply an accurate, predetermined voltage to the left-hand side of variable resistor R4. Charging current is then applied to an RC circuit comprising resistor R4, capacitor C2, and one of the three parallel capacitors C3, C4, or C5, which are selected by selector switch S3. When the charge across the capacitors reaches a predetermined voltage level, PNPN trigger device Q2 conducts and applies a trigger input pulse to SCR Q3, which then conducts through the primary winding 19 of transformer T2 and load resistance R5 to produce an output pulse on the secondary winding 20 of transformer T2. The output pulse produced on the secondary winding 20 is coupled to the trigger input terminal of SCR Q1 in the case of the off-duration timing circuit 13 or to the SCR quenching circuit 15 in the case of on-duration timing circuit 14. It will be appreciated by those skilled in the art that transformer T2 produces an output pulse only on the initial switching of SCR Q3, and that the output pulse on secondary winding 20 terminates after the steady state DC current has been established in primary winding 19. SCR Q3 continues to conduct after it has been triggered until the voltage is removed from the terminals +V and −V. At this time SCR Q3 is extinguished by the removal of voltage and the current in the primary winding 19 is cut off. This, of course, produces a negative going output pulse, but the negative going pulse has no effect upon the circuits to which the secondary winding 20 is connnected. The inductance of primary winding 19, of course, tends to keep the current flowing through SCR Q3 after the voltage is removed from the terminals +V and −V, and resistor R6 is coupled in parallel with SCR Q3 and primary winding 19 to absorb this inductive decay current.

In the circuit of FIG. 2, the time constant of the RC circuit is adjusted by means of selector switch S3, which selects a capacitance value for the circuit, and by the adjustable resistor R4, which selects the resistance value. Selector switch S3 acts as the coarse adjustment, and adjustable resistor R4 acts as the fine adjustment.

Figure 3:
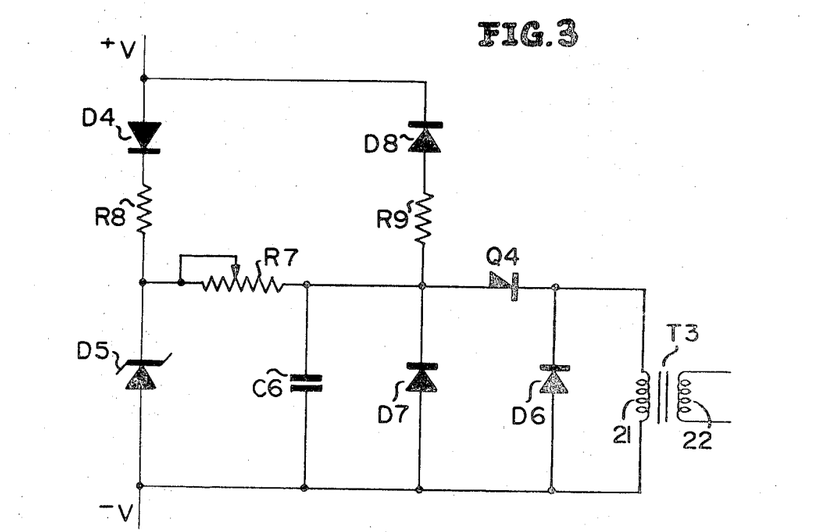
FIG. 3 is a schematic circuit diagram of one illustrative embodiment of the overload timing circuit of this invention.

FIG. 3 shows the preferred circuit to be used for overload timing circuit 17. This circuit is quite similar to the circuit shown in FIG. 2 and operates in substantially the same manner. Voltage applied between terminals +V and −V establishes a potential on an RC circuit comprising variable resistor R7 and capacitor C6 by forward conduction through diode D4, resistor R8 and reverse conduction through Zener diode D5. When the charge on capacitor C6 reaches a predetermined level, PNPN trigger device Q4 is triggered to apply a pulse of current to the primary winding 21 of the transformer T3 to produce an output pulse on the secondary winding 22 thereof. The output pulse from secondary winding 22 is coupled to variable transformer and switching circuit 12, as shown in FIG. 1, to remove power from the power supply circuit. When the power is removed, of course, the voltage will be removed from the terminals +V and −V, and conduction through PNPN trigger device Q4 will cease. The magnetic field in primary winding 21 will then collapse, and the inductive decay current caused thereby will discharge through diode D6, which is connected in parallel with primary winding 21. Diodes D7, D8, and resistor R9 constitute a conduction path for the inductive kickback voltage developed across primary winding 10 during the flyback period of the pulse applied thereto.

Figure 4:
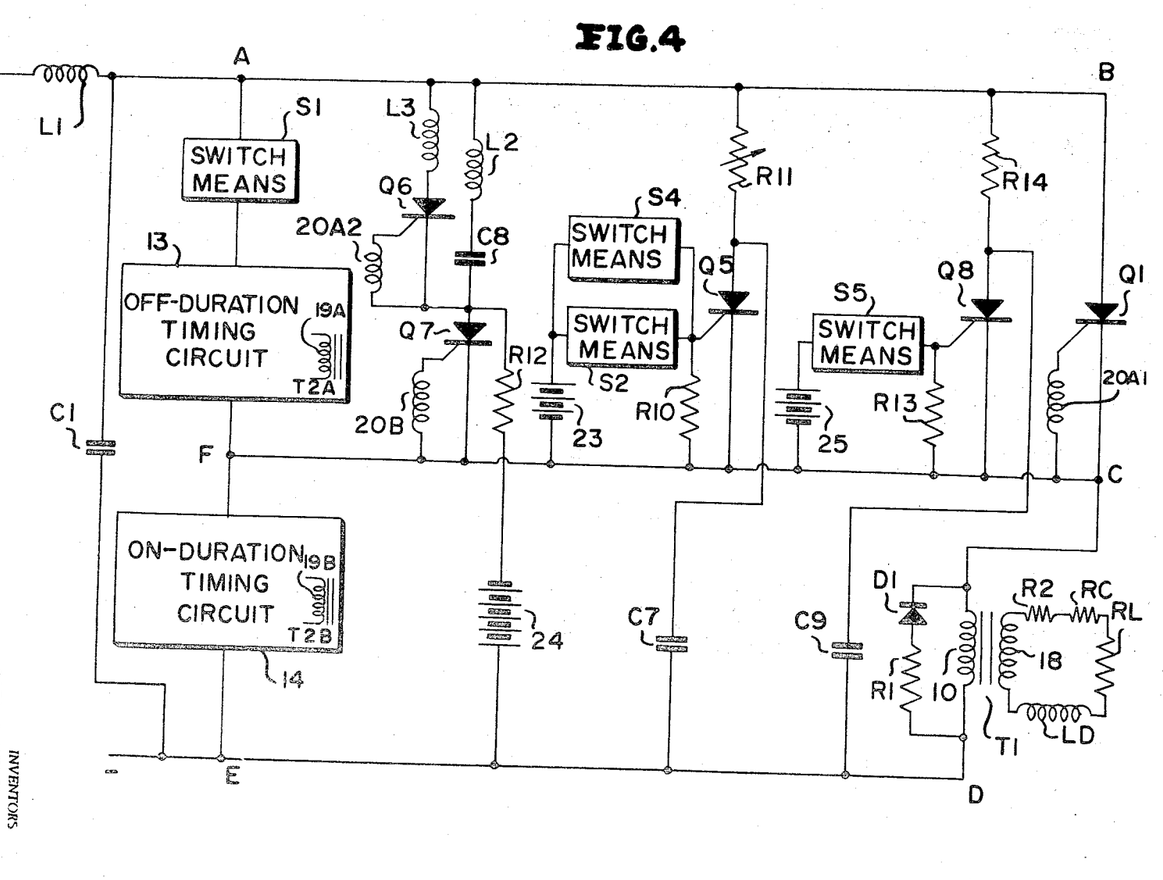
FIG. 4 is a schematic circuit diagram of one embodiment of the SCR quenching circuit and transformer biasing circuit of this invention.

FIG. 4 shows the preferred embodiments of SCR quenching circuit 15 and transformer biasing switch circuit 16. In FIG. 4, off-duration timing circuit 13 and on-duration timing circuit 14 both comprise circuits such as shown in FIG. 2, and the output transformers for these two circuits are shown within the boxes and labeled with the letters A and B to distinguish one from the other. The output transformer T2A for off-duration timing circuit 13 has two secondary windings, which are indicated by the designations 20A1 and 20A2. The output transformer T2B for on-duration timing circuit 14 has only one output winding which is indicated by the designation 20B. The particular circuit shown in FIG. 4 does not include overload timing circuit 17, although it will be apparent to those skilled in the art that the overload timing circuit could be added by simply connecting a circuit such as shown in FIG. 3 between conductors CF and DE. This particular embodiment of the invention is adapted to be used in seam welding of can bodies, and its operation is controlled by switch means which are responsive to the passage of a can body under the pressure roller electrodes of the seam welder. In the operation of the device, switch S2 is momentarily actuated as soon as a can body enters the pressure roller electrodes. This supplies voltage from a bias source 23 to a resistor R10 which is coupled to the trigger electrode of SCR Q5. SCR Q5 then conducts to provide a predetermined level of current flow through primary winding 10 via variable resistor R11. This establishes the average level of DC current flow in the primary winding 10 to condition the core of transformer T1 to its steady state magnetic level before the operation of the circuit commences. This eliminates the abnormal transient output which would otherwise occur during the first several cycles of operation. The resistance of R11 is, however, much larger than the resistance of primary winding 10, and accordingly, the voltage drop between points B and C on the circuit remain substantially at the full power supply voltage level while SCR Q5 is conducting. A capacitor C7, which is coupled between the anode of SCR Q5 and the negative power supply lead, helps to maintain the voltage between points B and C by discharging through SCR Q5 and providing a portion of the initial current through primary winding 10. The above described circuit elements constitute one portion of the transformer biasing switch circuit 16 shown in FIG. 1. The remaining portions will be described in later paragraphs.

After switch S2 has been momentarily closed to fire SCR Q5 and establish the average level of current in primary winding 10, switch S1 is closed by the can body to initiate operation of the seam welder. The closing of switch S1 initiates the timing cycle of off-duration timing circuit 13, as explained previously, and after a predetermined time interval an output pulse will be developed on primary winding 19A of output transformer T2A. This output pulse is coupled to secondary winding 20A1 to fire SCR Q1 and it is also coupled to secondary winding 20A2 to condition the SCR quenching circuit for operation as will be described later. The triggering of SCR Q1 applies a voltage pulse to primary winding 10, as explained previously, and reduces the voltage drop between points B and C to a very low level, thereby extinguishing SCR Q5. This automatically terminates the current flow provided to primary winding 10 to establish the average steady state DC current path. The application of voltage across primary winding 10 also initiates the timing cycle of on-duration timing circuit 14, as explained previously. Before the operation of on-duration timing circuit 14 can be explained however, it is necessary to describe the operation of the novel SCR quenching circuit of this invention, which is triggered by on-duration timing circuit 14 to turn SCR Q1 off. The SCR quenching circuit comprises a capacitor C8 which is coupled in a resonant charging circuit including inductors L2, L3 and SCR Q6. When voltage is initially applied to the circuit, capacitor C8 charges up to the full power supply voltage plus the voltage of an auxiliary power source 24, which is connected in series aiding with the power supply. When SCR Q1 is initially triggered by off-duration timing circuit 13, SCR Q6 is simultaneously triggered through secondary winding 20A2. Capacitor C8 then discharges through the resonant circuit loop and resonantly charges up in the opposite polarity to a voltage which is substantially equal to the power supply voltage plus the voltage of auxiliary power source 24. This reverse charging action occurs in a shorter time period than the on-duration of SCR Q1, and therefore capacitor C8 will be charged up in the reverse direction before on-duration timing circuit 14 fires. SCR Q6, of course, is automatically extinguished as soon as capacitor C8 is fully charged in the reverse direction. Resistor R12 prevents the charge on capacitor C8 from discharging in the reverse direction through auxiliary voltage source 24.

Thus, while on-duration timing circuit 14 is completing its timing cycle, a large reverse charge is developed on capacitor C8 by the above-noted resonant charging action, and at the end of the on-duration timing period, an output pulse is applied to the primary winding 19B of transformer T2B. This output pulse is applied to the secondary winding 20B, thereby firing SCR Q7 and applying the charge on capacitor C8 across SCR Q1. Since the charge on capacitor C8 is larger than the power supply voltage, and since it is in the reverse polarity of the power supply voltage, the firing of SCR Q7 quenches SCR Q1. Since the magnitude of the voltage on capacitor C8 is relatively large, SCR Q1 is quenched in a shorter time than would otherwise be obtainable by merely removing the power supply voltage therefrom.

When SCR Q1 is turned off, the full power supply voltage again appears between points B and C and the voltage between points C and D drops substantially to zero with the exception of the inductive kickback voltage caused by the decay of current in the secondary of transformer T1. The inductive kickback voltage recharges capacitor C8 to a value equal to the supply voltage plus the kickback voltage through the circuit path comprising conductor CF, SCR Q7, capacitor C8, inductor L2, conductor AB, capacitor C1, and conductor ED. SCR Q7, which was triggered to discharge capacitor C8 in order to quench SCR Q1, continues to conduct during the flyback voltage period until capacitor C8 is fully recharged. At this time the voltage drop across SCR Q7 falls to zero, and Q7 goes out of conduction. It will be apparent, then, that the auxiliary voltage source 24 is only used for the initial charge on capacitor C8. On every cycle after the first cycle, C8 is recharged by the power supply and the inductive kickback voltage.

The above described sequence of operation places the circuit back in its initial condition, and begins another timing cycle for off-duration timing circuit 13. The off and on-duration timing circuits then work alternately while the can body is passing under the pressure welder electrodes to generate the flat-topped current pulses that are required for seam welding. When the end of the can approaches the pressure welder electrodes, switch S4 is momentarily energized to establish the average level of DC current flow for the last cycle of operation to prevent inductive kickback when the circuit is turned off. The closure of switch S4 fires SCR Q5, which then passes DC current through the primary winding 10 as explained previously. When switch S4 is momentarily closed, switch S1 is simultaneously opened to terminate the welding operation. The operation of the switches is synchronized by switch actuating means which will be described in later paragraphs.

After SCR Q5 has been triggered to prevent an inductive kickback in the last cycle of welder operation, it is necessary to provide means for quenching SCR Q5, since it is normally quenched by the next cycle of inverter operation. This quenching of SCR Q5 is provided by momentary closure of switch S5, which couples a voltage source 25 to the trigger terminal of SCR Q8 through resistor R13, thereby triggering SCR Q8. The conduction of SCR Q8 quenches SCR Q5 by applying the voltage stored in capacitor C9 in the reverse direction across SCR Q5 through SCR Q8. The value of resistor R14 is selected to limit the flow of current through SCR Q8 below the level required to maintain conduction, and accordingly, after the charge on capacitor C9 has been depleted, SCR Q8 automatically extinguishes. The circuit is then returned to its original condition, and is ready to be reactuated when another can body passes between the pressure roller electrodes.

Figure 5:
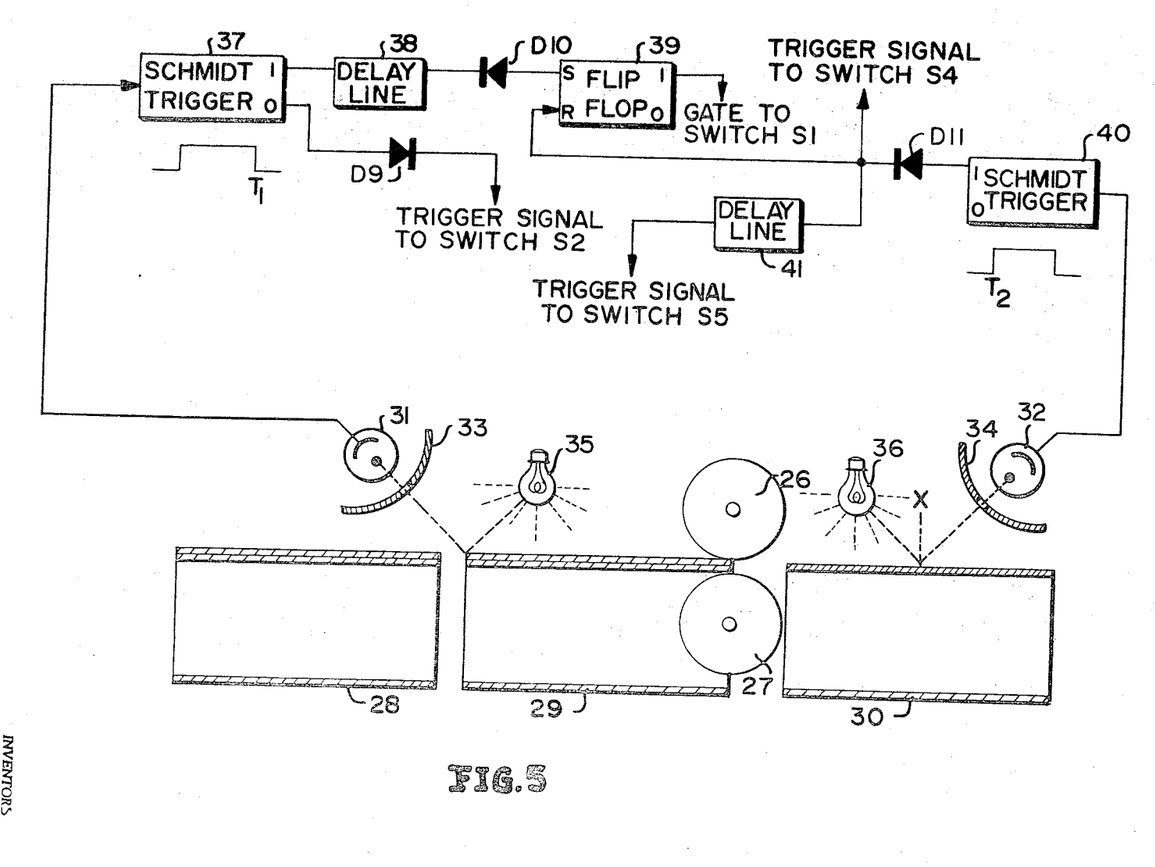
FIG. 5 is a block diagram of one illustrative switch actuating circuit for the embodiment of FIG. 4.

FIG. 5 shows the switch actuation means for actuating switches S1, S2, S4, and S5 in the sequence described above. The switches are actuated by photoelectric cells which detect the presence and position of can bodies passing between pressure roller electrodes 26 and 27. Three can bodies 28, 29, and 30 are shown disposed in the plane of pressure rollers 26 and 27 and it will be understood by those skilled in the art that the can bodies are moved through pressure roller electrodes 26 and 27 by means which are not shown in the drawings but which will be obvious to those skilled in the art. A pair of photo-electric cells 31 and 32 and a pair of corresponding slotted shields 33 and 34 are disposed above the can bodies in predetermined positions to indicate when the can body enters and leaves the pressure roller electrodes. Interacting with photocells 31 and 32 are corresponding lamps 35 and 36, which illuminate their respective photocells by reflection from the surface of the can bodies, which in this particular embodiment of the invention are highly reflective. Photocell 31, slotted shield 33, and lamp 35 are positioned so that the reflected illumination from the can body ceases just as the overlapped edges of the can body engage the pressure roller electrodes. This position is shown in FIG. 5 as the position of can body 29. It can be seen that as can body 29 advances beyond the position shown in FIG. 5, the illumination of photocell 31 by reflection will terminate. The output of photocell 31 is applied to a Schmitt trigger circuit 37 which produces a rectangular gate corresponding to the passage of a can body under photocell 31. The output waveform for Schmitt trigger 37 is indicated by the waveform immediately therebelow on the drawings. The trailing edge of this waveform, which is labeled T1 in the drawings, corresponds to the time when the can body initially engages the pressure roller electrodes. The trailing edge of the waveform is coupled through a diode D9 to switch S2 to fire SCR Q5 and establish the average flux level in the core of welding transformer T1. It should be noted that the signal to switch S2 is taken from the zero output terminal of Schmitt trigger 37, and that the waveform on the zero output terminal is inverted from the waveform shown in the drawings, whereby the positive going transition of the waveform constitutes the trailing edge thereof. The 1 output terminal of Schmitt trigger 37 is coupled to a delay line 38 which delays the output waveform by a predetermined amount to allow the can body to become fully engaged between the pressure rollers before beginning the seam weld. After this predetermined delay, the trailing edge of the output waveform from Schmitt trigger 37 is coupled to diode D10 to the set terminal of flip-flop 39, whose 1 output terminal applies a gate to switch S1 to close the switch and hold it closed until flip-flop 39 is reset. This initiates the seam welding of the overlapped edges between pressure rollers 26 and 27. As the can body passes through the rollers, substantially flat-topped pulses of current are periodically applied between the pressure rollers to produce a seam weld as described previously. Just before the can body leaves the pressure roller electrodes, the leading edge of the can body arrives at the position marked X, and light is initially reflected therefrom to photocell 32. Photocell 32 is coupled to a second Schmitt trigger 40 which produces a rectangular output gate in response to the passage of a can under the field of photocell 32. The output waveform for Schmitt trigger 40 is indicated by the waveform immediately under Schmitt trigger 40 on the drawing. The leading edge of this wave, which is indicated by the designation T2 on FIG. 5, corresponds to the time when the can body is just about to disengage from pressure roller electrodes 26 and 27. The leading edge of this waveform is coupled through a diode D11 to simultaneously reset flip-flop 39 and trigger switch S4. The resetting of flip-flop 39 opens switch S1, and the trigger to switch S4 fires SCR Q5 a second time. The output signal coupled through diode D11 is also applied to a delay line 41 and from delay line 41 the signal is coupled to switch S5 to trigger SCR Q8 and extinguish SCR Q5 as explained previously. The above noted sequence of operation is repeated for every can body as it passes through the pressure roller electrodes to control the operation of the circuit shown in FIG. 4 in accordance with the sequence described above.

From the foregoing description it will be apparent that this invention provides a high current power supply which is capable of providing substantially flat-topped output pulses in the neighborhood of 10,000 amperes at 500 cycles per second. It will also be apparent that this invention provides improved circuits for wave shaping of flat-topped high current pulses, and improved circuits for quenching silicon controlled rectifiers and for initially biasing transformers to receive large levels of current.

What is claimed is:

1. A high current square wave power supply for producing substantially flat-topped output current pulses having a substantially fast rise time comprising a direct current power source, a transformer having primary and secondary windings, first switch means coupled in series between the primary winding of said transformer and said power source, first switch actuation means for periodically actuating said first switch means to apply voltage pulses to said primary winding, current wave shaping means including a charge storing and discharge providing capacitor coupled in parallel with said switch means and said primary winding, an isolating inductance coupled between one terminal of said power source and one terminal of said capacitor, said isolating inductance being in series with said first switch means and said primary winding, a resistance in series with the secondary winding of said transformer, a second switch means coupled in parallel with said first switch means, second switch actuation means for momentarily actuating said second switch means prior to the application of the first voltage pulse to said secondary winding and subsequent to the application of the last voltage pulse to said secondary winding, and a resistor coupled in series with said second switch means and said primary winding to limit the current flow through said primary winding when said second switch means is actuated to the average level of DC current that flows through said primary winding in response to the periodic actuation of said first switch means.

2. A square wave power supply as defined in claim 1 wherein said first switch means is periodically turned on and off for predetermined time periods, and also including a diode and a resistor coupled in series across said primary winding, said diode being connected in opposite polarity to said power source.

3. A supply according to claim 1 wherein said first switch means comprises controlled rectifier means coupled to said primary winding, said first actuation means comprising means for applying control signals to said controlled rectifier means to repetitively trigger said controlled rectifier means into conduction.

4. A square wave power supply as defined in claim 1 wherein said first and second switch means comprise first and second silicon controlled rectifiers, said second switch actuation means being operable to fire said second silicon controlled rectifier before the initial firing of said first silicon controlled rectifier and after the final firing of said first silicon controlled rectifier, said first switch actuation means being operable to periodically fire said first silicon controlled rectifier after said second silicon controlled rectifier has been fired, the initial firing of said first silicon controlled rectifier being operable to quench said second silicon controlled rectifier by dropping the voltage thereacross below the minimum conduction level therefor, and also including means for quenching said second silicon controlled rectifier by applying a reverse voltage thereacross after said second silicon controlled rectifier has been fired subsequent to the final firing of said first silicon controlled rectifier.

5. A square wave power supply as defined in claim 4, and also including a silicon controlled rectifier quenching circuit including a quenching capacitor connected in a resonant circuit loop, means for charging said quenching capacitor to a voltage higher than said power supply voltage, third switch means coupled in said resonant circuit loop, means for actuating said third switch means simultaneously with the firing of said first silicon controlled rectifier to permit said quenching capacitor to discharge around said resonant circuit loop and to re-charge in the opposite direction, fourth switch means coupled between said quenching capacitor and said first silicon controlled rectifier, and means for actuating said fourth switch means a predetermined time after said first silicon controlled rectifier has been fired to quench said first silicon controlled rectifier by applying the charge on said quenching capacitor in the reverse direction thereacross.

6. A square wave power supply as defined in claim 5 wherein said third and fourth switch means comprise third and fourth silicon controlled rectifiers respectively, said quenching capacitor and said fourth silicon controlled rectifier being coupled in series with each other and in parallel with said first silicon controlled rectifier, an inductor coupled with said quenching capacitor to form said resonant circuit loop, and said third silicon controlled rectifier being coupled in series with said inductor and said quenching capacitor in said resonant circuit loop.

7. A square wave power supply as defined in claim 6 and also including an overload timing circuit coupled in parallel with said primary winding, said overload timing circuit comprising means for producing an output signal a predetermined time after a voltage is applied thereacross by said primary winding, means for disconnecting said direct current power source from said square wave power supply, and said output signal being coupled to said disconnecting means to automatically disconnect said direct current power source from said square power supply if a voltage appears across said primary winding longer than said predetermined time.

8. A square wave power supply as defined in claim 7 wherein said overload timing circuit comprises a resistor-capacitor charging circuit coupled in parallel with said primary winding, a trigger device coupled to the capacitor of said resistor-capacitor charging circuit and operable to be rendered conductive by a predetermined voltage level on said charging circuit capacitor, and output means coupled to said trigger device and operable in response to conduction thereof to produce said output signal.

9. A square wave power supply as defined in claim 8 and also including a Zener diode and a resistor coupled in series with each other and in parallel with said primary winding, said resistor-capacitor charging circuit being coupled to said Zener diode to be actuated by the voltage drop thereacross.

10. The combination defined in claim 9 and also including a second transformed having primary and secondary windings, the primary winding of said second transformer being coupled in series with said trigger device, the secondary winding of said second transformer being coupled to said disconnecting means, and a diode coupled in parallel with the primary winding of said second transformer, said diode being poled in opposition to the direction of current flow produced in said primary winding of said second transformer by conduction of said trigger device.

11. A high current square wave power supply for producing substantially flat-topped output current pulses having a substantially fast rise time comprising a direct current power source, a transformer having primary and secondary windings, first switch means coupled in series between the primary winding of said transformer and said power source, first switch actuation means for periodically actuating said first switch means to apply square wave voltage pulses to said primary winding, second switch means coupled with said transformer, second switch actuation means for momentarily actuating said second switch means prior to the application of the first voltage pulse to said secondary winding and subsequent to the application of the last voltage pulse to said secondary winding, and a resistor coupled in series with said second switch means and said primary winding to limit the current flow through said primary winding when said second switch means is actuated to the average level of DC current that flows through said primary winding in response to the periodic actuation of said first switch means.

12. A square wave power supply as defined in claim 11 wherein said first and second switch means comprise first and second silicon controlled rectifiers, said second switch actuation means being operable to fire said second silicon controlled rectifier before the initial firing of said first silicon controlled rectifier and after the final firing of said first silicon controlled rectifier, said first switch actuation means being operable to periodically fire said first silicon controlled rectifier after said second silicon controlled rectifier has been fired, the initial firing of said first silicon controlled rectifier being operable to quench said second silicon controlled rectifier by dropping the voltage thereacross below the minimum conduction level therefor, and also including means for quenching said second silicon controlled rectifier by applying a reverse voltage thereacross after said second silicon controlled rectifier has been fired subsequent to the final firing of said first silicon controlled rectifier.

13. A square wave power supply is defined in claim 12 wherein said last mentioned means comprises a circuit branch coupled in parallel with said first and second silicon controlled rectifiers including a third silicon controlled rectifier, a capacitor coupled in parallel with said third silicon controlled rectifier and said primary winding, means for firing third silicon controlled rectifier after said second silicon controlled rectifier has been fired subsequent to the final firing of said first silicon controlled rectifier, thereby applying the charge on said capacitor in the reverse direction across said second silicon controlled rectifier to quench said second silicon controlled rectifier, and a resistor coupled in series with said third silicon controlled rectifier in said circuit branch to limit the current flow through said third silicon control rectifier due to said power supply to a level below the minimum conduction level therefor, whereby said third silicon controlled rectifier is automatically quenched when said condenser discharges.

14. A high current square wave power supply for producing substantially flat-topped output current pulses having a substantially fast rise time comprising a direct current power source, a transformer having primary and secondary windings, first switch means including a first silicon controlled rectifier coupled in series between the primary winding of said transformer and said power source, means for periodically firing said silicon controlled rectifier to apply square wave voltage pulses to said primary winding, and a silicon controlled rectifier quenching circuit including a capacitor connected in a resonant circuit loop, means for charging said capacitor to a voltage higher than said power supply voltage, second switch means coupled in said resonant circuit loop, means for actuating said second switch means simultaneously with the firing of said first silicon controlled rectifier to permit said capacitor to discharge around said resonant circuit loop and to re-charge in the opposite direction, third switch means coupled between said capacitor and said first silicon controlled rectifier, and means for actuating said third switch means a predetermined time after said first silicon controlled rectifier has been fired to quench said first silicon controlled rectifier by applying the charge on said capacitor in the reverse direction thereacross.

15. A square wave power supply as defined in claim 14 wherein said second and third switch means comprise second and third silicon controlled rectifiers respectively, said capacitor and said third silicon controlled rectifier being coupled in series with each other and in parallel with said first silicon controlled rectifier, an inductor coupled with said capacitor to form said resonant circuit loop, and said second silicon controlled rectifier being coupled in series with said inductor and said capacitor in said resonant circuit loop.

16. A high current square wave power supply for providing a square wave current output signal train and comprising a relatively high current direct current source, an output transformer and switch means, said output transformer and said switch means being connected in series across said direct current source, switch actuation means coupled with said switch means for actuating said switch means to connect and disconnect said output transformer and said direct current source, transformer bias means for establishing an initial flux level in said transformer to assure a relatively consistent square wave output train of current signals, means responsive to initial actuation of said switch means at the beginning of a train of output current signals for deactivating said transformer bias means, and pulse shaping means including means for decreasing the rise and fall time of the square wave output.

17. The power supply of claim 16 wherein said pulse shaping means further comprises damping resistance means connected with the output of said output transformer.

18. The power supply of claim 16 wherein said pulse shaping means comprises means connected across the input to said output transformer for limiting the voltage induced thereacross upon a decrease in the current in the output of said transformer.

19. In a square wave welding supply for providing approximate square wave welding current wave train, the combination comprising a source of direct current, a welding transformer having a primary and a secondary, a first switch means for repetitively coupling said source of direct current to said welding transformer primary, said first switch means being a controlled rectifier, inductance means connected in series with said first switch means in circuit between said source and said welding transformer primary, a first capacitor means in series with said inductance means and a terminal of said source of direct current, switch actuation means for periodically actuating said first switch means, a second capacitor means connected in series with said primary and said source of direct current via a second switch means, means for charging said second capacitor means to a DC voltage greater than the voltage of said source of direct current, means responsive to said switch actuation means for reversing the polarity of the charge on said second capacitor means during times said first switch means is conducting, means responsive to said switch actuation means for supplying the reversed polarity charge from said second capacitor means across said controlled rectifier whereby conduction of the controlled rectifier is quickly extinguished, said means for charging said second capacitor means to a DC voltage greater than the voltage of said source of direct current comprising a second switch means responsive to said switch actuation means connected in series with said second capacitor means between said source of direct current and said primary for allowing current produced by inductive kick back voltage caused by decay in said secondary to flow to said second capacitor means from said primary and for blocking current flow from said second capacitor means in the reverse direction whereby said second capacitor means is periodically charged to a voltage greater than the voltage of said source of direct current during times said first switch means is not conducting and the kick back voltage appears.

20. A square wave welding supply according to claim 19 including a resistance means in series with the secondary of said transformer and terminals for welding electrode means for damping distorting effects of inherent inductance and inductance of said welding electrode means, whereby current pulses applied to a welding load may be substantially flat-topped.

21. A square wave power supply as defined in claim 20 wherein said first switch means is periodically turned on and off for predetermined time periods, and also including a diode and a resistor connected directly in series across said primary, said diode being connected in opposite polarity to said power source.

22. A welding power supply comprising main DC power source means for supplying two main DC power conductors, a welding transformer having a primary and a secondary for supplying welding current to a workpiece, switch means for connecting said primary across said two main conductors, switch actuation means for periodically actuating said swich means to provide current reversing in said primary, said switch means comprising at least one controlled rectifier, means for repeatedly applying a reverse bias voltage across said controlled rectifier, said means for repeatedly applying a reverse bias including a resonant circuit including an inductor and a capacitor, controlled rectifier means connected with said resonant circuit for allowing current produced by inductive kick back voltage caused by decay of current in said secondary to flow to said capacitor in a first direction from said primary and for blocking current flow from said capacitor in the reverse direction and means for providing a greater DC voltage than the DC voltage of said main DC power source means for initially charging said capacitor to said greater DC voltage, whereby said capacitor is resonantly recharge to a voltage higher than the voltage of said main DC power source means following discharge thereof.

23. A welding power supply according to claim 22 including a resistance means in series with the secondary and terminal means for welding electrode means for damping distorting effects of inherent inductance and inductance of said welding electrode means, whereby current pulses applied to a welding load may be substantially flat-topped.

24. A supply according to claim 23 wherein said switch actuation means comprising means for applying control signals to said controlled rectifier means to repetitively trigger said controlled rectifier means into conduction.

References Cited
UNITED STATES PATENTS

| | | | |
|---|---|---|---|
| 2,364,079 | 12/1944 | Klemperer | 320—1X |
| 2,473,575 | 6/1949 | Dawson | 320—1X |
| 2,508,103 | 5/1950 | Dawson | 320—1X |
| 2,515,634 | 7/1950 | Dawson et al. | 320—1 |
| 3,354,322 | 11/1967 | Eastop | 307—246 |
| 3,474,214 | 10/1969 | Ferguson | 321—2X |
| 2,472,110 | 6/1949 | Klemperer | 219—113 |
| 2,610,288 | 9/1952 | Cage | 321—4 |
| 3,178,607 | 4/1965 | Lobur | 323—41X |
| 3,233,116 | 2/1966 | Watrous | 219—114X |
| 3,260,916 | 7/1966 | Watrous | 321—14X |

WILLIAM H. BEHA, Jr., Primary Examiner

U.S. Cl. X.R.

219—110, 114; 320—1; 321—4, 16; 323—22